March 8, 1938.    J. A. GROSS    2,110,148
JOINT
Filed Sept. 2, 1936
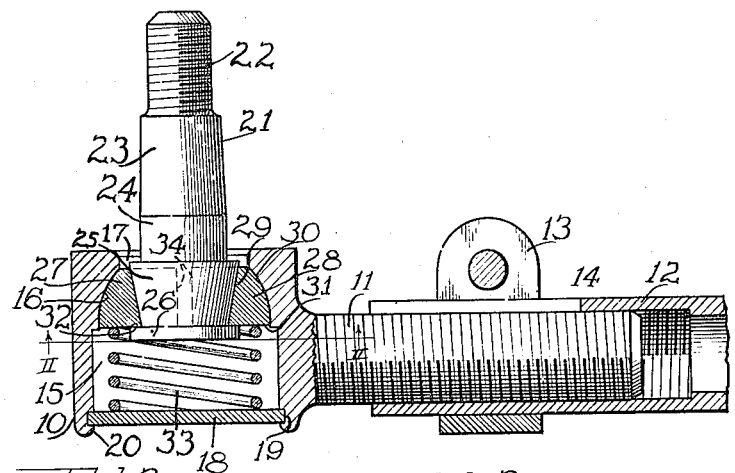
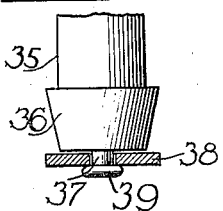
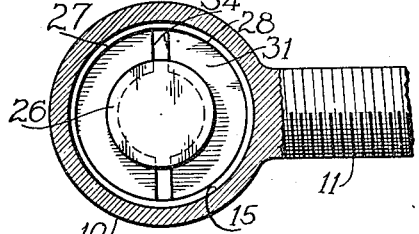
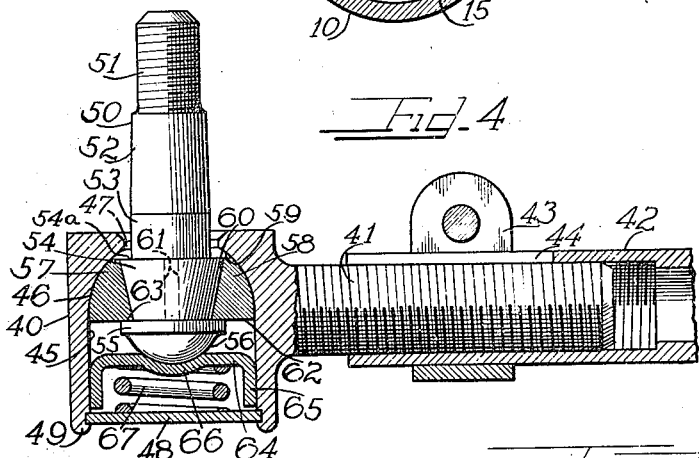
Inventor
JOHN ARTHUR GROSS
by Charles Hill Attys.

Patented Mar. 8, 1938

2,110,148

UNITED STATES PATENT OFFICE 2,110,148

JOINT

John Arthur Gross, Wilmette, Ill., assignor to Thompson Products Incorporated, Cleveland, Ohio, a corporation of Ohio Application September 2, 1936, Serial No. 99,055

4 Claims. (Cl. 287—90)

This invention relates to joint structures having separate pairs of bearing surfaces for rotation and for tilting and more particularly relates to tie rod joints having tapered stud heads seated in spaced complementary seating elements which are tiltably mounted in housings.

It is an object of this invention to provide a joint structure utilizing a stud having a head portion tapering toward the bottom of the stud.

A further object of this invention is to provide a tie rod joint wherein spaced complementary elements take up wear on a tapered stud head rotatable in the elements.

Another object of this invention is to provide a tie rod joint having separate pairs of bearing surfaces for rotation of a stud element about its own axis and for universal tilting movement of the stud relative to the housing with each pair of bearing surfaces converging in opposite directions.

A still further object of this invention is to provide a tie rod joint structure including a stud member having a head portion tapering toward the end of the stud and an enlarged base portion adjacent the apex of the tapered portion for holding the stud in the joint.

Other and further objects of this invention will become apparent to those skilled in the art from the following detailed description of the annexed sheet of drawing which discloses preferred embodiments of the invention.

On the drawing:

Figure 1 is a vertical cross-sectional view, with parts in elevation, of an assembled joint structure according to this invention.

Figure 2 is a fragmentary horizontal cross-sectional view taken substantially along the line II—II of Figure 1.

Figure 3 is a fragmentary elevational view, with a part in vertical cross-section, of a modified form of stud adapted for use in the joint structures illustrated in Figures 1 and 2.

Figure 4 is a vertical cross-sectional view, with parts in elevation, of a modified form of joint assembly according to this invention.

As shown on the drawing:

As shown in Figures 1 and 2, the reference numeral 10 indicates generally a housing member having a laterally extending shank portion 11 integral therewith and adapted to be inserted into a tie rod 12 or other hollow link connection. The shank 11 is threaded into the tie rod end and secured therein by means of a clamp 13. The end of the tie rod is preferably slotted as shown at 14 to permit the clamp 13 to compress the tie rod end around the shank.

The housing 10 has a substantially cylindrical bore 15 therein, provided near the top thereof with a segmental spherical bearing surface 16 terminating in an annular opening 17, giving entrance to the housing. The other end of the housing 10 is closed by a plate 18 seated in a groove 19 formed within the housing walls. The plate 18 is held in position by peening or spinning the ends of the housing 10 thereover as indicated at 20.

A joint stud 21 having a threaded top portion 22, an intermediate tapered portion 23, a cylindrical portion 24 below the tapered portion, a frusto-conical head portion 25 tapering toward the bottom of the stud and an enlarged bottom portion 26 formed on the apex of the frusto-conical portion 25.

A pair of spaced complementary segmental annular seating elements 27 and 28 are interposed between the frusto-conical head 25 of the stud and the segmental spherical bearing surface 16 of the housing. The seating elements 27 and 28 have tapering inner bearing surfaces 29 cooperating with the frusto-conical bearing surface 25 of the stud head and segmental spherical outside bearing surfaces 30 cooperating with the segmental spherical bearing surface 16 of the housing 10.

The seating elements 27 and 28 also have flat bottom portions 31 adapted to bear against the rim surface 32 of the enlarged portion 26 of the stud.

A coiled spring is held under compression between the closure plate 18 for the housing 10 and the flat surfaces 31 of the seating elements 27 and 28, thereby urging said seating elements upwardly in the housing into full seating engagement with the bearing surface 16 of the housing. Since the bearing surface 16 converges toward the opening 17 to the housing an upward urging of the seating elements obviously tends to move the same closer together to close up the space 34 therebetween and to maintain the frusto-conical surface 25 of the stud head in full bearing engagement with the tapering inner surfaces 29 of the seating elements. The rim or shoulder 32 contacting the flat bottoms 31 of the seating elements serves as a retaining means for preventing the withdrawal of the stud from within the seating elements.

From the above description of Figures 1 and 2 it should be understood that the stud 21 is freely rotatable about its own axis on bearing surfaces provided by the stud head 25 and the inner tapering surfaces 29 of the seating elements 27 and 28. Relative tilting movements between the stud 21 and the housing 10 are provided by the cooperating bearing surfaces 16 of the housing and 30 of the seating elements. The joint structure has an automatic wear take-up feature in that the spring 33 in urging the seating elements 27 and 28 in the direction of convergence of the bearing surface 16 of the housing, causes the seating elements to move closer together into full seating engagement along their inner surfaces 29 with the stud 25. Any desired relative resistance between the tilting and rotating movements of the stud can be provided by varying the angle of taper of the stud head and cooperating inner surfaces of the seating element. Since the ta- surfaces of the seating element. Since the tapered stud head converges toward the enlarged portion 26 of the stud a wear take-up between the rim surface 32 of the portion 26 and the bottom 31 of the seating element is also provided since the seat elements in moving closer together tend to slide the stud upward until the rim portion 32 is in full seating engagement with the bottom 31 of the seating element.

In Figure 3 there is illustrated a stud 35 that can be used in place of the stud 21 described in Figures 1 and 2. As shown in Figure 3, the stud 35 has a frusto-conical head portion 36 thereon, a lug 37 extending from the central portion of the end of the head 36, and a washer 38 loosely mounted around the lug 37 and retained thereon by peening the end of the lug as at 39 to form an enlarged head. The stud 35 therefore has a separately mounted retainer portion thereon which is movable relative to the stud. This stud arrangement provides for a rotation of the stud about its own axis without a movement of the retainer member 38 relative to the bottoms of the seating elements.

In Figure 4 the joint structure therein illustrated includes a housing 40 having an integral laterally extending threaded shank portion 41 threaded into a tie rod end 42 and clamped therein by means of a clamp 43. The end of the tie rod 42 is preferably slotted at 44 to permit the clamp 43 to compress the tie rod end around the shank 41.

The housing 40 has a substantially cylindrical bore 45 therein provided near the top thereof with a segmental spherical bearing surface 46. An opening 47 of smaller diameter than the diameter of the bore 50 gives entrance to the housing. The other end of the housing 40 is closed by a plate 48 peened or spun into the housing walls as at 49.

A stud 50 having a threaded top portion 51, a tapered intermediate portion 52, a cylindrical portion 53 therebelow, an enlarged frusto-conical head portion 54 tapering toward the bottom of the stud, and an enlarged portion 55 having a rounded bottom 56 extends through the opening 47 with the head and bottom portions thereof disposed in the housing.

A pair of spaced complementary seating elements 57 and 58 are disposed between the frusto-conical head 54 of the stud and the segmental spherical bearing surface 46 of the housing. The seating elements 56 and 57 have outer segmental spherical bearing surfaces 59 cooperating with the bearing surface 46 of the housing and inner tapering bearing surfaces 60 cooperating with the frusto-conical head 54. The seating elements 57 and 58 thus surround the stud head 54 but are spaced from each other as indicated at 61.

The base 54a of the frusto-conical head 54 is preferably larger than the diameter of the housing opening 47 to prevent removal of the stud from the housing through this opening.

The seating elements 57 and 58 preferably have flat base portions 62 for receiving thereagainst the shoulder or rim 63 of the enlarged stud portion 55.

A slidable retainer member 64 is mounted within the housing 40 beneath the rounded end 56 of the stud and has a depending skirt portion 65 slidable along the walls of the bore 45 of the housing. The retainer member 65 has a depressed central portion 66 adapted to partially receive the rounded end 56 of the stud.

A coiled spring 67 is held under compression between the retainer member 64 and the closure plate 48 of the housing, thus urging the retainer member 64 upwardly in the housing against the stud end 56. This upward urging of the retainer member 64 moves the shoulder 63 of the enlarged portion 55 of the stud against the bottoms 62 of the seating elements 57 and 58. The shoulder portion 63 in turn moves the seating elements 57 and 58 upwardly in the housing along the converging segmental spherical bearing surface 46 of the housing. The converging surfaces tend to move the seating elements 57 and 58 closer together and thus insure a full bearing engagement of the tapering surfaces 60 of the seating elements with the frusto-conical head 54 of the stud. In this manner the single spring 67 serves as a wear take-up means for all of the bearing surfaces of the joint and prevents the joint element from becoming loose even after severe wear of the bearing surfaces.

From the above description of Figure 4 it should be understood that the stud 50 is freely rotatable about its own axis on the bearing surfaces provided by its frusto-conical head 54 and the tapering inner surfaces 60 of the seating elements 57 and 58. Relative tilting movements between the stud and housing are permitted by the bearing surface 46 of the housing and the outer bearing surfaces 59 of the seating elements. The provision of a larger base on the head of the stud than the opening giving entrance to the joint housing prevents a removal of the stud head from the housing even in the event of failure of any of the normally operative stud retaining means.

The joints of this invention utilize studs having heads that can be readily fabricated by upsetting operations and bearing elements that can be machined in a much more simple manner than is required for the machining of ball headed studs and sockets therefor.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In a joint, a housing having a bearing surface therein, a stud extending freely from said housing, said stud having a bearing surface disposed in the housing, a pair of spaced opposed segmental annular seating elements interposed between the stud and housing, said seating elements having inner bearing surfaces cooperating with the stud bearing surface and outer bearing surfaces coöperating with the housing bearing surface, said sets of cooperating bearing surfaces converging in opposite general directions, one of said sets of cooperating bearing surfaces being shaped for accommodating tilting movements of the stud relative to the housing and the other of said sets of bearing surfaces being shaped for accommodating rotation of the stud about its own axis, said stud having a retainer portion on the end thereof abutting the seating elements to hold the stud head in the seating elements and resilient means urging the seating elements in the direction of convergence of their outer bearing surfaces to maintain proper bearing relation of the cooperating sets of bearing surfaces and to take up wear developed during use of the joint.

2. A joint assembly comprising a housing having a segmental spherical bearing surface therein, a stud having a shank portion extending freely from said housing and a frusto-conical head portion in said housing, said frusto-conical head portion converging in a direction opposite to the direction of convergence of the segmental spherical bearing surface of the housing, a pair of spaced opposed segmental annular seating elements disposed between the bearing surface of the housing and the frusto-conical head of the stud, said seating elements having tapering inner bearing surfaces cooperating with the stud head to permit rotation of the stud about its own axis and also having segmental spherical outside bearing surfaces cooperating with the housing bearing surface to permit tilting of the stud relative to the housing, said stud head having an enlarged portion at the end thereof adapted to abut the seating elements for preventing a withdrawal of the stud head therefrom and resilient means urging the seating elements in the direction of convergence of their outer bearing surfaces for maintaining proper assembled relation of the joint and to take up wear of the bearing surfaces.

3. A tie rod joint comprising a housing having a cylindrical bore therein, a segmental spherical bearing surface adjacent said bore and an annular opening giving entrance to the housing, a closure plate at the base of said bore for sealing the housing, a pair of segmental annular seating elements having outer segmental spherical bearing surfaces bearing on the bearing surface of the housing and inner bearing surfaces tapering in a direction opposite to the direction of convergence of the housing bearing surface, a stud having a tapering head portion seated in said seating elements and a shoulder portion abutting the bases of said seating elements, and a coiled spring maintained under compression between the closure plate of the housing and the seating elements to urge said elements in the direction of convergence of their outer bearing surfaces for taking up wear of the joint parts.

4. A tie rod joint comprising a stud having a frusto-conical head portion, a lug extending from said head portion at the apex thereof, a washer held around said lug and having an outer periphery of greater diameter than the apex diameter of the stud head, said washer being freely rotatable relative to the stud head, a pair of segmental annular seating elements disposed in spaced opposed relation to each other around the stud head and abutting the washer, said seating elements having tapering inner surfaces cooperating with the stud head to permit rotation of the stud about its own axis and also having outer segmental spherical bearing surfaces, said inner and outer surfaces of the seating elements converging in opposite directions, a joint housing having an inner segmental spherical bearing surface for receiving the outer bearing surfaces of the seating elements whereby the stud can tilt relative to the housing on said surfaces and spring means urging the seating elements in the direction of convergence of their outer bearing surfaces for maintaining the joint parts in operative assembly.

JOHN ARTHUR GROSS.